No. 827,322. PATENTED JULY 31, 1906.
H. F. PARSHALL.
DISTANT CONTROL OF ELECTRIC MOTORS.
APPLICATION FILED APR. 26, 1904.
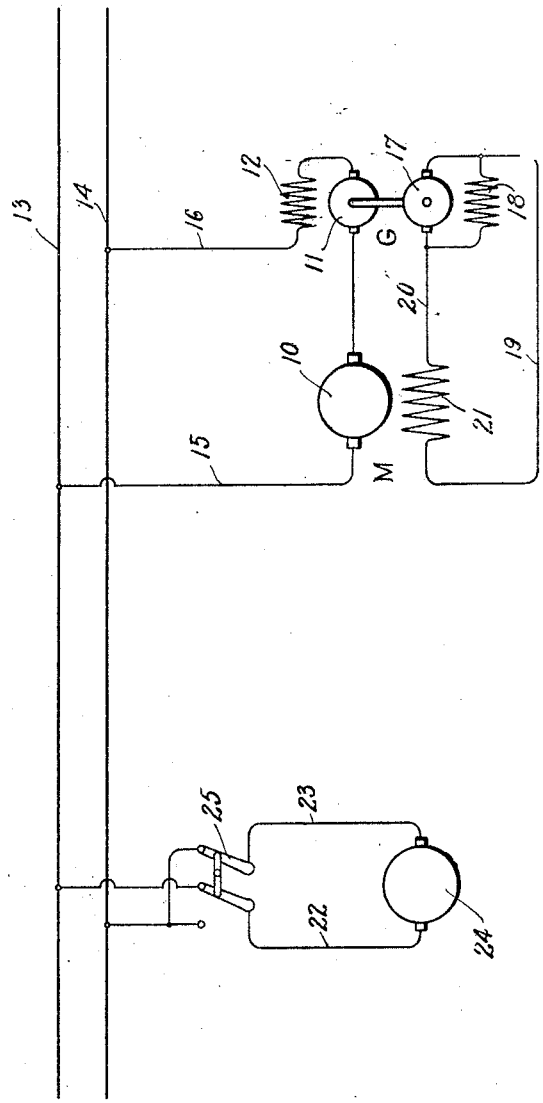
Witnesses:
George A. Thornton.
Helen Oxford
Inventor:
Horace F. Parshall.
by Albert G. Davis
Att'y.

UNITED STATES PATENT OFFICE.

HORACE F. PARSHALL, OF LONDON, ENGLAND, ASSIGNOR TO GENERAL ELECTRIC COMPANY, A CORPORATION OF NEW YORK.

DISTANT CONTROL OF ELECTRIC MOTORS.

No. 827,322.     Specification of Letters Patent.     Patented July 31, 1906.

Application filed April 26, 1904. Serial No. 204,927.

*To all whom it may concern:*

Be it known that I, HORACE F. PARSHALL, a citizen of the United States, residing at Salisbury House, London Wall, London, E. C., England, have invented certain new and useful Improvements in Distant Control of Electric Motors, of which the following is a specification.

My invention relates to systems of motor control of the type in which the motor is located at one point and its controlling mechanism at a point distant therefrom. Such systems are of particular application in the operation of electrically-driven valves in ship-steering gear and the like. In systems of this type heretofore employed in addition to the mains which supply the current to the motor other conductors are employed between the controlling-point and the motor in order to control the direction of rotation of the motor.

The principal object of the present invention is to do away with these control-wires and to provide means by which the direction of rotation of the motor may be reversed by simply reversing the direction of current in the supply-mains.

Other objects and advantages of my invention will be apparent from the following detailed description, taken in connection with the accompanying drawing, in which is illustrated one embodiment of my invention.

In carrying out my invention I employ a separately-excited motor M, in which the direction of rotation depends upon the direction of current through the armature and in which the field-coils are excited by a small motor-generator G, whose direction of rotation is independent of the direction of current and which consists of a motor of the series type driving a small exciting-generator. The armatures 10 and 11 of the principal motor and the auxiliary motor, respectively, and the field-coils 12 of the latter are connected in series to the supply-mains 13 and 14 by suitable leads 15 16. The auxiliary-motor armature 11 is direct-connected to the exciting-generator armature 17, which is provided with a shunt-field 18 and is connected, through suitable leads 19 and 20, to the field-coils 21 of the principal motor M. The supply-mains 13 and 14 are connected by leads 22 23 to a generator 24 or other suitable source of electric energy. At any desired point in the main circuit a reversing-switch 25 is provided for changing the direction of the current in the mains 13 and 14.

It will be apparent from the above that when the switch 25 is thrown from one position to the other the direction of the current in the circuit, including the armatures 10 and 11 and the field-coils 12, will be reversed. The reversal of current in both the members 11 and 12 of the motor part of the motor-generator will leave the direction of rotation of the armatures 11 and 17 the same, and the exciting-generator will continue to supply current to the field-coils 21 in the same direction as before. Thus a movement of the switch 25 will cause a reversal of current in the armature 10 without a corresponding reversal in the field-coils 21, and the direction of rotation of the armature will be accordingly changed. It should also be noted that the proportion of torque and speed of the auxiliary motor will vary with the current, so that the excitation of the principal motor can follow generally the law of excitation of a series motor or can be varied, as desired.

It is apparent that modifications and alterations may be made in the system disclosed without departing from the spirit of my invention, and I aim to cover by the terms of the appended claims all such alterations and modifications.

What I claim as new, and desire to secure by Letters Patent of the United States, is—

1. In a system of motor control, the combination of supply-mains, a motor having one of its members connected to said mains and subjected to the same changes in direction of current as occur in said mains, and a motor-generator fed from said mains and operated to maintain the direction of current in the other member of said motor unchanged during changes in direction of current in said mains.

2. In a system of motor control, the combination of supply-mains, a motor having its armature connected thereto and its field-coils separately excited, and a motor-generator connected to said line and operated to maintain the direction of current in said coils unchanged during changes in the direction of current in said mains.

3. In a system of motor control, the combination of supply-mains, a principal motor having separately-excited field-coils, and a motor-generator having its motor-armature and field connected to said mains and its generator-armature connected to supply current to the field-coils of said principal motor.

4. In a system of motor control, the combination of supply-mains, a principal motor having separately-excited field-coils, a motor-generator having its motor-armature and field connected to said mains and its generator connected to supply current to the field-coils of said principal motor, and means for reversing the current in said armature.

5. In a system of motor control, the combination of supply-mains, a principal motor having its field-coils separately excited, an auxiliary motor connected in series with the principal motor-armature, and a generator driven by said auxiliary motor and connected to supply current to the field-coils of said principal motor.

6. In a system of motor control, the combination of supply-mains, means for reversing the direction of current-flow through said mains, a principal motor having its armature connected in circuit with said mains, an auxiliary series motor connected in series with the armature of the principal motor, and a generator driven by said auxiliary motor and connected to supply current to the field-coils of said principal motor.

In witness whereof I have hereunto set my hand this 14th day of April, 1904.

HORACE F. PARSHALL.

Witnesses:
HERMAN ERNEST DICK,
H. CLAY EVANS.